United States Patent [19]

Takano

[11] Patent Number: 5,453,732
[45] Date of Patent: Sep. 26, 1995

[54] SHIFT LEVER POSITION SENSOR

[75] Inventor: Tsunesuke Takano, Tokyo, Japan

[73] Assignee: Daiichi Denso Duhin Co., Ltd., Japan

[21] Appl. No.: 251,936

[22] Filed: Jun. 1, 1994

[30] Foreign Application Priority Data

Jun. 18, 1993 [JP] Japan .................... 5-172586

[51] Int. Cl.$^6$ ..................... B60Q 1/00
[52] U.S. Cl. ............. 340/456; 200/61.88; 116/28.1; 74/473 R; 74/335
[58] Field of Search ................ 340/456, 686; 200/61.88, 61.28, 61.91; 116/28.1, DIG. 20; 74/473 R, 335, 475

[56] References Cited

U.S. PATENT DOCUMENTS

| | | | |
|---|---|---|---|
| 4,155,068 | 5/1979 | Zajichek | 540/456 |
| 4,155,324 | 5/1979 | Schwabe | 116/28.1 |
| 4,191,064 | 3/1980 | Houk et al. | 116/28.1 |
| 4,199,747 | 4/1980 | Miller et al. | 200/61.88 |
| 4,660,430 | 4/1987 | Bortfield et al. | 200/61.88 |
| 5,351,570 | 10/1994 | Mizunuma et al. | 74/473 R |
| 5,398,018 | 3/1995 | Polityka | 340/456 |

*Primary Examiner*—Brent Swarthout
*Assistant Examiner*—Niva Tong
*Attorney, Agent, or Firm*—Nixon & Vanderhye

[57] ABSTRACT

The object of the present invention is to provide a shift lever position sensor that is inexpensive and has a simple structure. A shift lever position sensor is described wherein, in the composing of a position sensor of a shift lever 2 that rotates along positioning plate 1, said position sensor detects the position of said shift lever 2 with the operation of switch 10 by providing oscillating lever 9 which positions said shift lever 2, one end of which is pivotally attached to said shift lever 2 rotating along the lateral surface of said positioning plate 1 using end 3 as fulcrum 4, the other end of which constantly makes resilient contact with irregularly formed portion 8 of said positioning plate 1 with resilient member 6 locked at said pivoting location, and controlling said switch 10 attached to said shift lever 2 by linking with the movement of said oscillating lever 9.

1 Claim, 6 Drawing Sheets

SHIFT LEVER POSITION SENSOR

FIELD OF THE INVENTION

The present invention relates to a shift lever position sensor used to operate the transmission of an automobile and so forth, and more particularly, to that having a simplified apparatus constitution.

BACKGROUND OF THE INVENTION

An example of this type of shift lever position sensor of the prior art is described in Japanese Laid-Open Patent Publication No. 1-87946 (Japanese Laid-Open Patent Publication No. 64-87946).

In this shift lever position sensor, when a first electrical signal is emitted as a result of only one of a plurality of switching devices of a shift lever position sensor being closed, a CPU writes the corresponding position data into a memory device. When only one of the switching devices of the transmission is emitting an electrical signal of a first level L of switch closing, the CPU writes the corresponding position data into memory, and these are used as control parameters of the transmission.

In the above-mentioned apparatus, when two or more switching devices emit a signal of a first level or all switching devices emit a signal of a second H level, and a signal error continues for a prescribed period of time with the vehicle speed according to the signal of a vehicle speed pulse generator being equal to or greater than a prescribed value, an error warning occurs and a warning is emitted by a shift lever warning lamp.

In addition to there being a plurality of switches in the above-mentioned prior art, a CPU is required, thus resulting in the disadvantages of having a complicated constitution and being expensive.

SUMMARY OF THE INVENTION

In order to solve the above-mentioned problems, the object of the present invention is to provide a shift lever position sensor that is inexpensive and has a simple structure.

The above-mentioned object of the present invention can be achieved by composing a shift lever position sensor of a shift lever, which rotates forward and backward along the lateral surface of the above-mentioned positioning plate, which detects the position of said shift lever with the operation of a switch by providing an oscillating lever which positions said shift lever, one end of which is pivotally attached to said shift lever, which rotates along the lateral surface of said positioning plate using its end as a fulcrum, the other end of which constantly makes resilient contact with irregularly formed portions of said positioning plate with a resilient member locked at said pivoting location, and controlling said switch attached to said shift lever by linking with the movement of said oscillating lever.

BRIEF DESCRIPTION OF THE ACCOMPANYING DRAWINGS

DETAILED DESCRIPTION OF THE PREFERRED EXEMPLARY EMBODIMENT

The following provides an explanation of the embodiments of the present invention with reference to the drawings.

Figure 1:
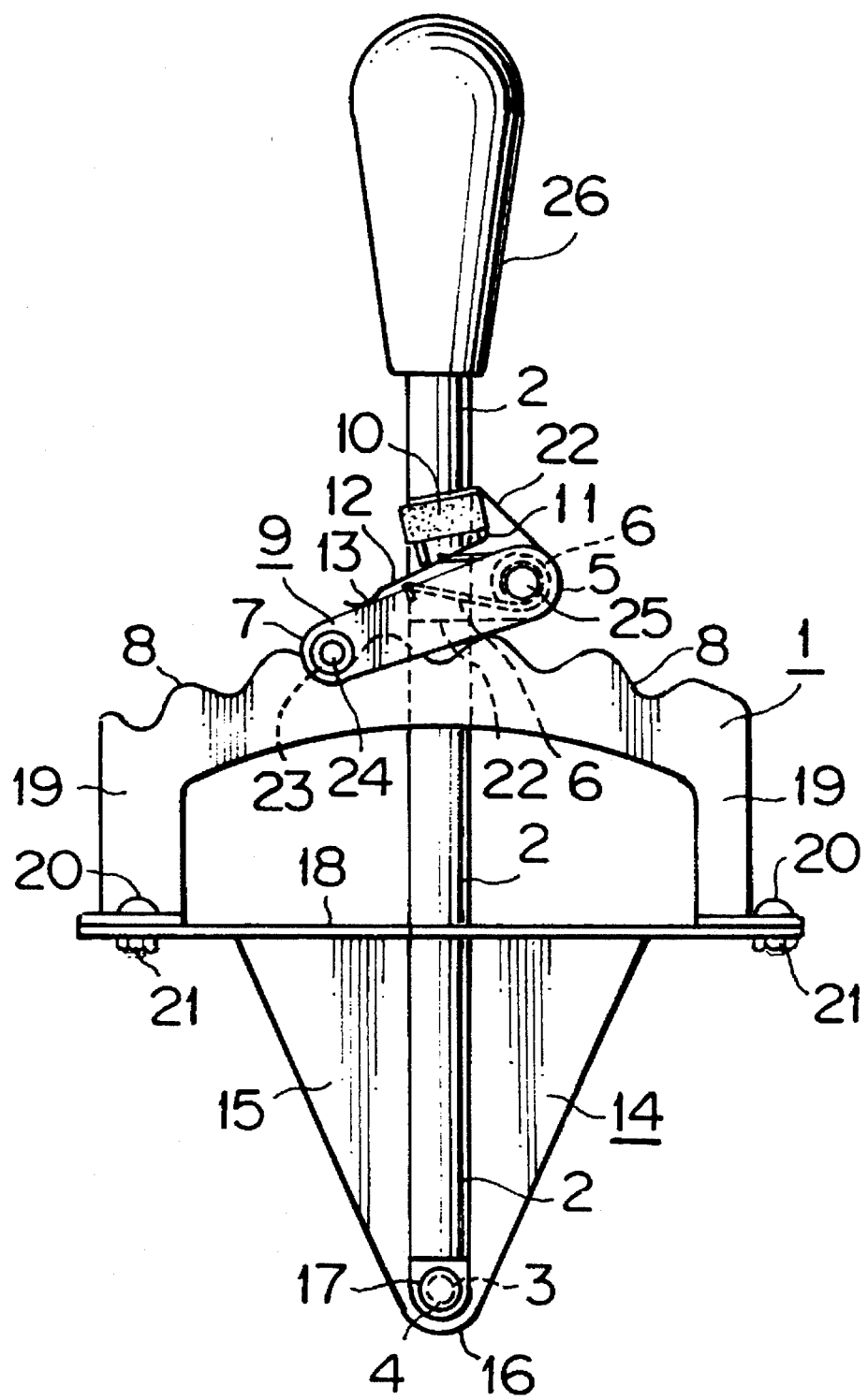
FIG. 1 is a front view of the position sensor of the present invention.
Figure 2:
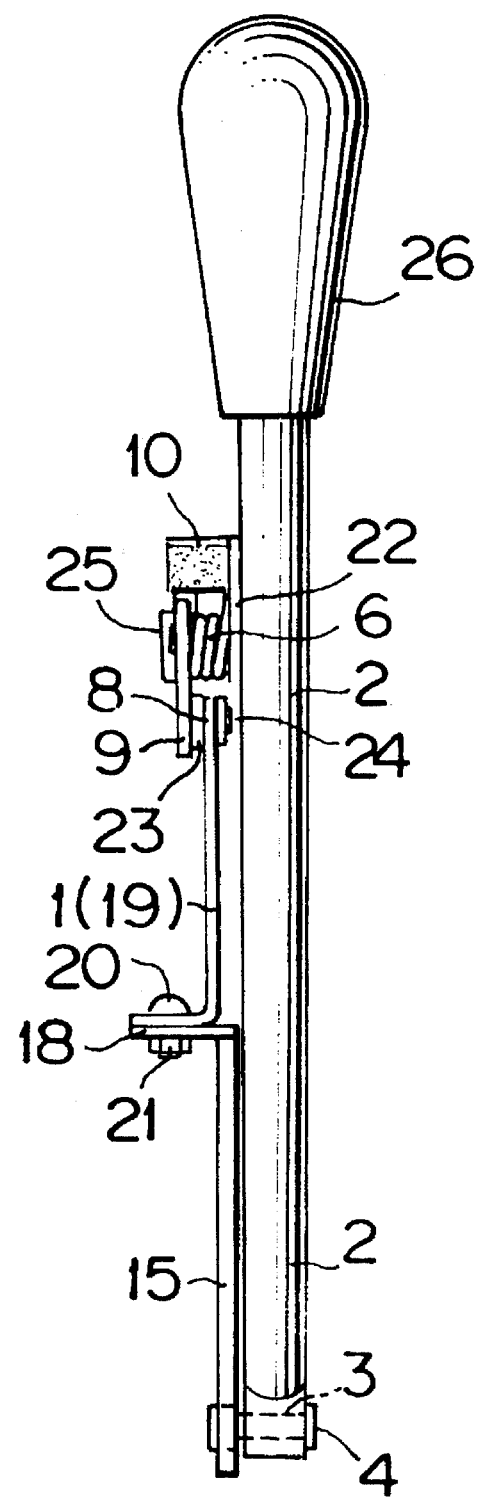
FIG. 2 is a side view of the same.
Figure 3:
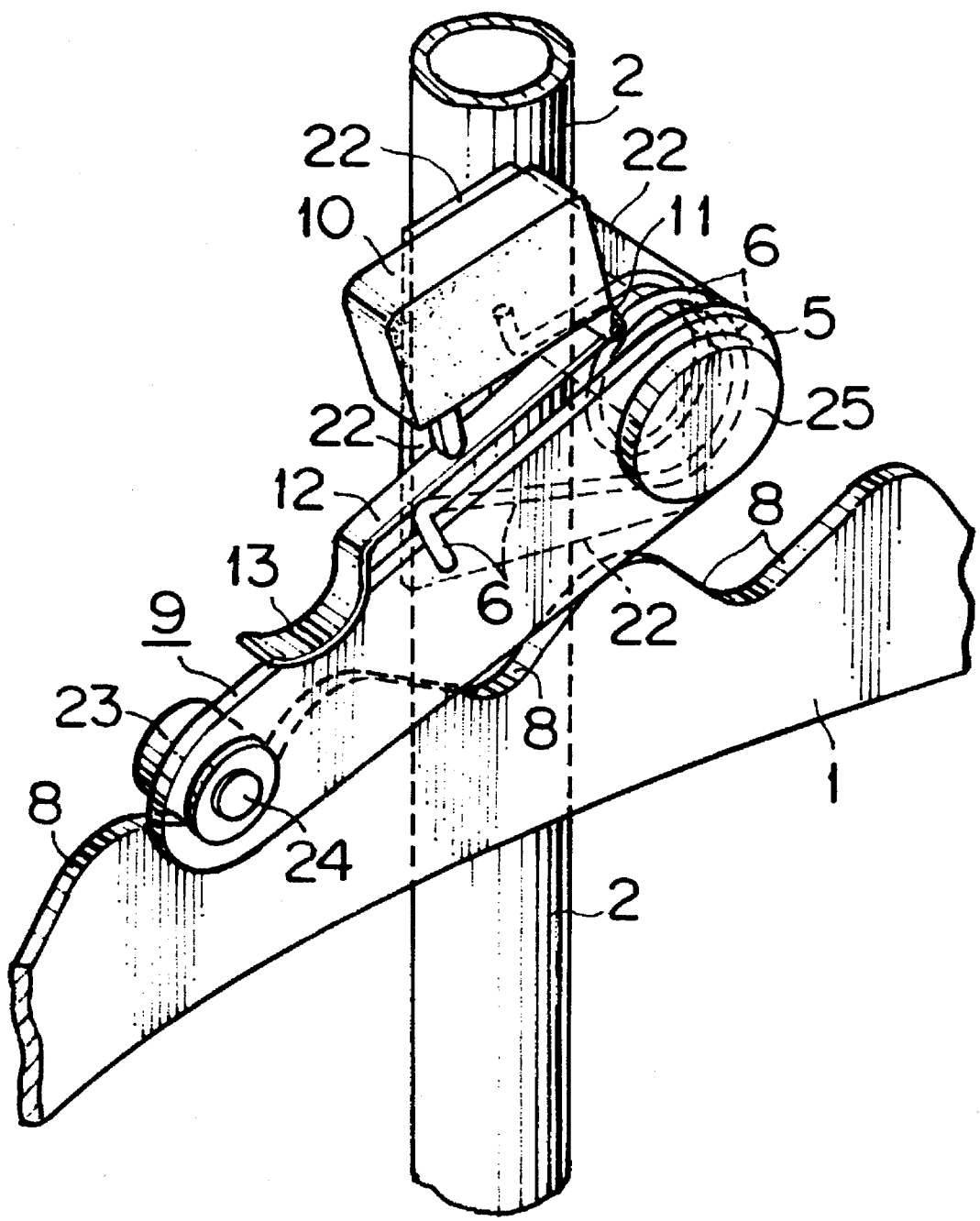
FIG. 3 is an enlarged perspective view of the mechanical portion for shift lever position detection.

To begin with, as shown in FIGS. 1 through 3, the basic constitution of the present invention is that for detecting the position of a shift lever 2, which controls changes in speed by rotating along positioning plate 1, (which detects the position of said shift lever 2 with the switching operation of switch 10, being operated with actuator 12,) which operates linked to the operation in the vertical direction of oscillating lever 9, one end 13 of said actuator 12, the other end 11 of which is pivotally attached to said switch 10 attached to said shift lever 2, makes contact with said oscillating lever 9 for stopping said shift lever 2 at certain positions and detecting those stopped positions, one end 5 of which is pivotally attached to said shift lever 2, able to move forward and backward along the lateral surface of said positioning plate 1 using its end 3 as fulcrum 4, and the other end 7 of which constantly makes contact with irregularly formed portion 8 of said positioning plate 1 by resilient member 6 locked at said pivoting location.

More specifically, as shown in FIGS. 1 and 2, end 3 of shift lever 2 is pivotally attached with pin 17 to swing freely to apex 16 of vertical support 15 of metal bracket 14, said vertical support 15 being a metal plate having a triangular or roughly sail shape, the bottom end of which being bent at a right angle.

A pair of mounting legs 19, formed by bending the end of positioning plate 1, which is provided with roughly U-shaped, wave-shaped irregularly formed portion 8 on the outside of its curved portion, are fixed on the horizontal support 18 of this support bracket 14 with screws 20 and nuts 21 so that said irregularly formed portion 8 is located above.

Figure 4:
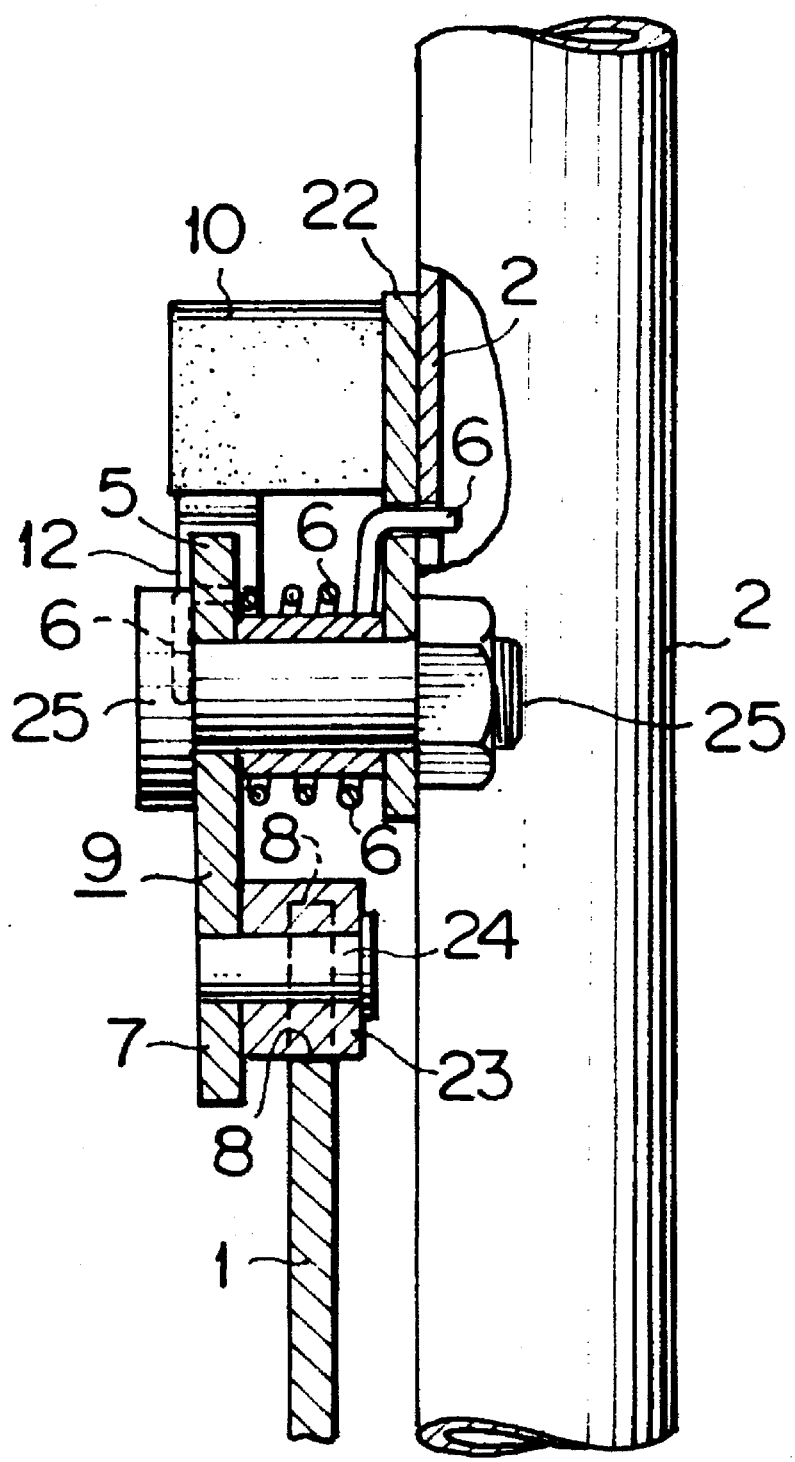
FIG. 4 is an enlarged cross-sectional view of the same.

As shown in FIGS. 3 and 4, roughly triangular shaped mounting plate 22 is welded in parallel with the plate surface of said positioning plate 1 at a location roughly ⅔ the total length of shift lever 2 from said end 3 of said shift lever 2, namely at a location just above said irregularly formed portion 8. Switch (toggle switch) 10, equipped with actuator 12, is bolted to the upper portion of this mounting plate 22. The above-mentioned oscillating plate 9, bushing 23, having a diameter slightly smaller than the radius of curvature of the valleys of the above-mentioned wave-shaped irregularly formed portion 8, being attached so as to rotate freely to one end of which with pin 24, is attached to the apex of said mounting plate 22 with support shaft 25, which passes through a shaft hole formed in its other end.

During this attachment, bent one end of resilient member (spring) 6 is inserted and fixed in a small hole opened in the above-mentioned mounting plate 22 so that the above-mentioned support shaft 25 passes through said resilient member 6 between the above-mentioned oscillating lever 9 and said mounting plate 22. The similarly bent other end of said resilient member 6 is locked to the upper edge of said oscillating lever 9, and as a result of continuously applying rotating force in the direction towards positioning plate 1 to said oscillating lever 9, bushing 23 is kept in contact with the above-mentioned wave-shaped irregularly formed portion 8.

In the assembled state, adjustments are made so that the curved other end of actuator 12, one end of which is axially supported by switch 10, makes contact with the upper surface of the above-mentioned oscillating lever 9. In addition, adjustments are also made so that the above-mentioned actuator 12 does not push the knob of switch 10 when bushing 23 is located in a valley of irregularly formed portion 8, but does push down on said knob of switch 10 when said bushing 23 is located on a crest. A lead wire from the above-mentioned switch 10 is led to the outside from a hole opened in the side of end 3 of shift lever 2 through the inside of said shift lever 2.

The position sensor of the present invention is composed in the manner described above. The following provides an explanation of the operation of this position sensor of the present invention.

Figure 5:
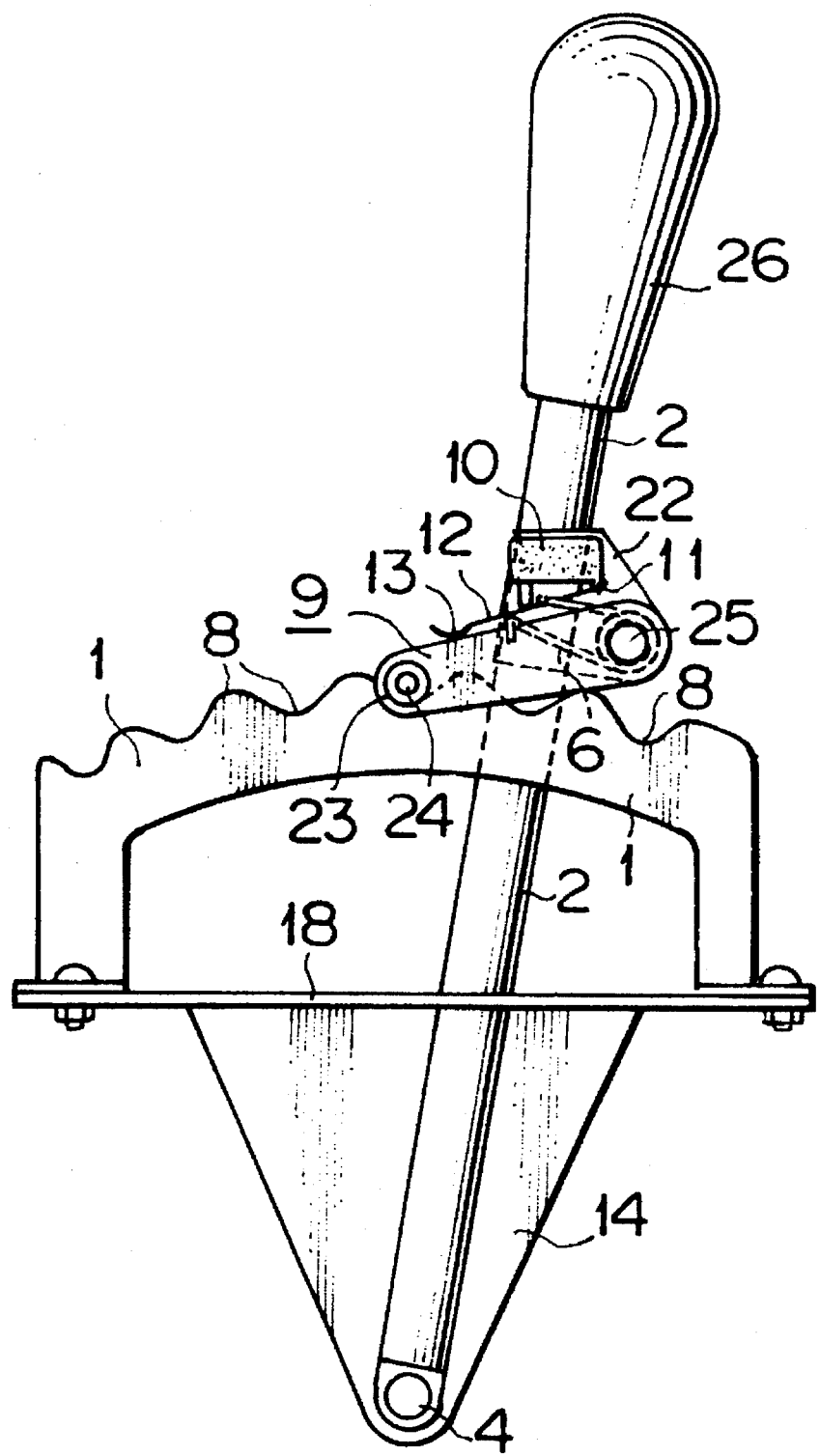
FIG. 5 is a front view showing the state in which the shift lever is stopped at a normal position.
Figure 6:
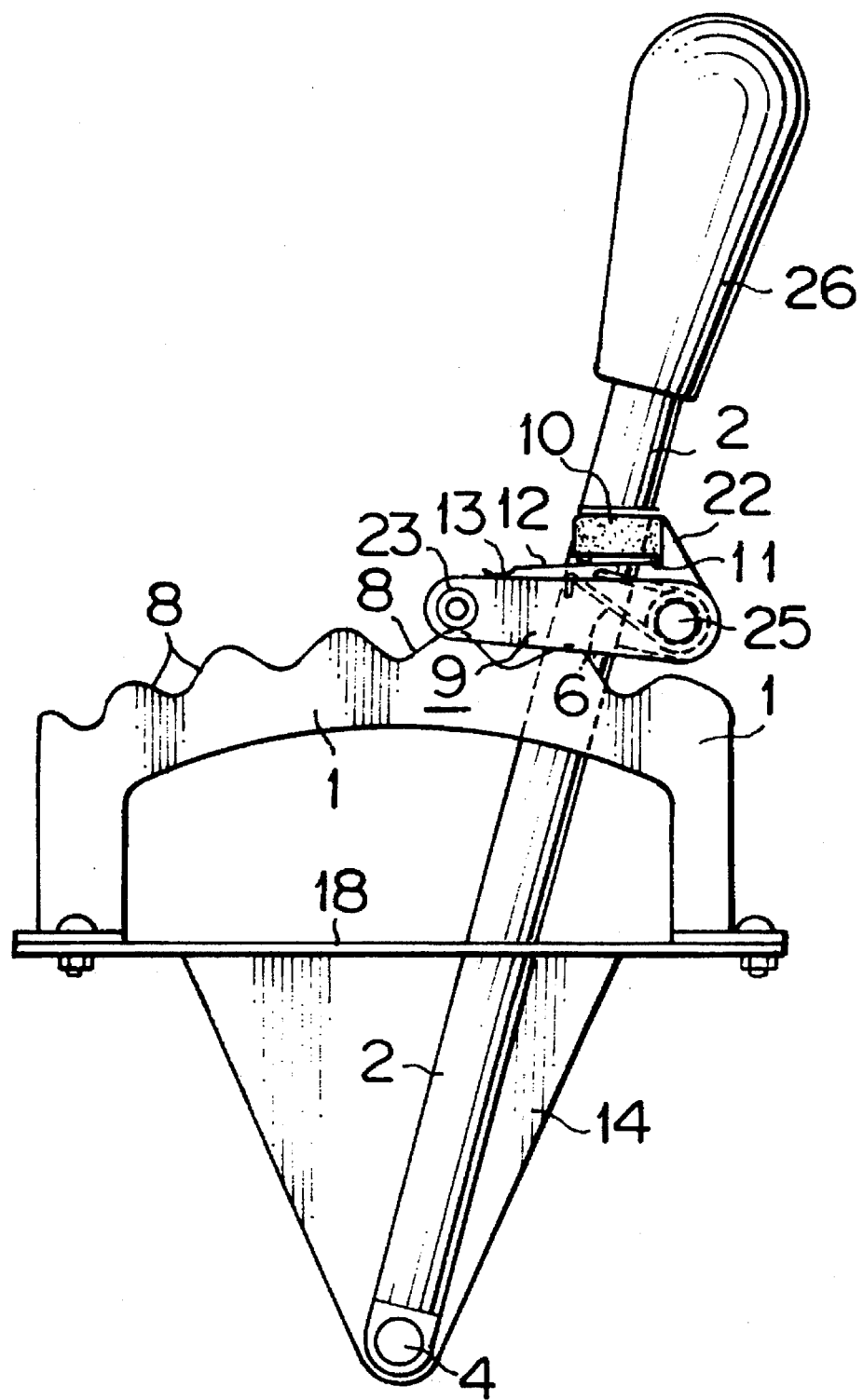
FIG. 6 is a front view showing the state in which the shift lever is stopped at an abnormal position.

When an operator pulls knob 26 of shift lever 2 forward (right side in the drawing) as shown in FIG. 6, at which position bushing 23 of oscillating lever 9 has ridden up onto a crest of irregularly formed portion 8, from the normal position shown in FIG. 5, namely the position at which the above-mentioned shift lever 2 is stopped at a certain position at which bushing 23 of oscillating lever 9 is in a valley of irregularly formed portion 8, said oscillating lever 9 rotates by a distance equal to the height of the crest in the clockwise direction in opposition to the resiliency of resilient member 6, pushing actuator 12 upward corresponding to the amount of rotation and thereby switching on switch 10 due to pushing down the knob of said switch 10.

If a warning is emitted in the case the duration with which switch 10 is switched on is remarkably longer in comparison with the duration with which switch 10 is switched on at the average speed at which shift lever 2 is moved, the operator can be notified that shift lever 2 has been stopped at an intermediate position at which it must not be stopped, namely a position at which bushing 23 of oscillating lever 9 is positioned on a crest of irregularly formed portion 8, or in other words, an unstable position.

More specifically, this can be realized by providing a timer circuit which operates when switch 10 is switched on, and composing a circuit so that a warning circuit operates when the output of said timer circuit exceeds a certain amount of time, and said timer circuit goes off when said switch 10 is switched off.

Furthermore, in addition to the mechanical switch employing an actuator as described above, a photoelectric switch (circuit), using a photoelectric device which interrupts a light path with the movement of oscillating lever 9, a magnetic switch (circuit), using a Hall device which magnetically converts the movement of lever 9, or other known switching devices and variable resistance devices can be used for switch 10.

The present invention demonstrates the effects described above as a result of being composed in the manner explained above.

In the present invention, by providing a switch which operates linked to the operation of an oscillating lever for stopping a shift lever at a certain position, and switching said switch on and off accompanying rotation of said shift lever due to the relationship between said oscillating lever and the irregularly formed portion of a positioning plate, since an error in the position of said shift lever can be detected corresponding to, for example, the duration switch 10 is switched on, only 1 switch is required, including that for the contact point of position detection, thereby offering the advantages of being easy to make and easy to use since the constitution can be fabricated both simply and inexpensively and a CPU and its input devices and so forth are not required.

What is claimed is:

1. A shift lever assembly comprising:

a pivotally movable shift lever;

a positioning plate having an irregularly shaped surface portion for positioning said shift lever; and a shift lever position sensor for detecting the position of said shift lever relative to said position plate, said shift lever position sensor including:
  (i) an oscillating lever having one end which is pivotally attached to said shift lever so as to be movable with said shift lever relative to said positioning plate, and another end which constantly makes resilient contact with said irregularly shaped surface portion of said positioning plate;
  (ii) a resilient member which resiliently urges said another end of said oscillating lever into constant contact with said irregularly shaped surface portion of said positioning plate; and
  (iii) a position sensing switch attached to said shift lever and operable in response to pivotal movement of said oscillating lever caused by contact between said another end thereof and the irregularly shaped surface portion of said positioning plate during movement of said shift lever relative to said positioning plate, whereby the position of the shift lever is sensed.

* * * * *